(12) United States Patent
Klaas

(10) Patent No.: US 11,963,510 B2
(45) Date of Patent: Apr. 23, 2024

(54) CONTROL UNIT, SYSTEM AND METHOD RELATED TO AN ANIMAL'S ENERGY BALANCE

(71) Applicant: DELAVAL HOLDING AB, Tumba (SE)

(72) Inventor: Ilka Klaas, Tumba (SE)

(73) Assignee: DeLaval Holding AB, Tumba (SE)

( * ) Notice: Subject to any disclaimer, the term of this patent is extended or adjusted under 35 U.S.C. 154(b) by 206 days.

(21) Appl. No.: 17/422,377

(22) PCT Filed: Jan. 13, 2020

(86) PCT No.: PCT/SE2020/050021
§ 371 (c)(1),
(2) Date: Jul. 12, 2021

(87) PCT Pub. No.: WO2020/149778
PCT Pub. Date: Jul. 23, 2020

(65) Prior Publication Data
US 2022/0142110 A1    May 12, 2022

(30) Foreign Application Priority Data
Jan. 16, 2019   (SE) .................................... 1950047-9

(51) Int. Cl.
*A01J 5/01* (2006.01)
*A01K 29/00* (2006.01)

(52) U.S. Cl.
CPC ............... *A01J 5/01* (2013.01); *A01K 29/005* (2013.01)

(58) Field of Classification Search
CPC ........................................................ A01J 5/01
See application file for complete search history.

(56) References Cited

U.S. PATENT DOCUMENTS

| 5,769,024 A | 6/1998 | Örnerfors et al. |
| 6,394,028 B1 * | 5/2002 | Birk .......... A01J 5/007 119/14.08 |

(Continued)

FOREIGN PATENT DOCUMENTS

| EP | 1 279 326 | 1/2003 | |
| WO | WO-0189292 A1 * | 11/2001 | .............. A01J 5/007 |
| WO | 2008/051137 | 5/2008 | |

OTHER PUBLICATIONS

Orffa, "Ketosis in dairy cows and the role of choline", Jan. 2014 (Year: 2014).*

(Continued)

*Primary Examiner* — Joshua D Huson
*Assistant Examiner* — Alanna K Peterson
(74) *Attorney, Agent, or Firm* — NIXON & VANDERHYE

(57) ABSTRACT

A control unit is configured to obtain measurements of milk flow during a milking session of the animal (101) and analyse a sequence of the obtained measurements. Based on the analysis, the control unit estimates a total milk yield of the animal (101) and determines a predetermined partial amount of milk of the estimated total milk yield. During early lactation, the control unit interrupts the milking of the animal on all teats when the predetermined partial amount of milk of the estimated total milk yield has been drawn from the animal, or detects that the milk flow has reached a plateau phase and interrupts the milking during the plateau phase (220).

9 Claims, 4 Drawing Sheets

(56) References Cited

U.S. PATENT DOCUMENTS

| | | | | |
|---|---|---|---|---|
| 8,505,482 | B2* | 8/2013 | Sandberg | ............... A01J 5/007 |
| | | | | 119/14.08 |
| 8,573,155 | B2* | 11/2013 | Arvidsson | ............... A01J 5/045 |
| | | | | 119/14.08 |
| 2004/0244699 | A1 | 12/2004 | Schwering et al. | |
| 2008/0109266 | A1 | 5/2008 | Björk et al. | |
| 2008/0127896 | A1 | 6/2008 | Petterson et al. | |
| 2011/0247563 | A1 | 10/2011 | Schrader et al. | |
| 2011/0303155 | A1 | 12/2011 | Tucker, Jr. et al. | |
| 2020/0281151 | A1* | 9/2020 | Schmidt | ............... A01K 11/006 |

OTHER PUBLICATIONS

E. Carbonneau, et al., "The effect of incomplete milking or nursing on milk production, blood metabolites, and immune functions of dairy cows", Journal of Dairy Science, vol. 95, No. 11, Sep. 2012, pp. 6503-6512 (11 pages), http://dx/doi.org/10.3168/jds.2012-5643.
Search Report for SE Application No. 1950047-9 dated Aug. 8, 2019, 3 pages.
International Search Report for PCT/SE2020/050021 dated Feb. 28, 2020, 3 pages.
Written Opinion of the ISA for PCT/SE2020/050021 dated Feb. 28, 2020, 5 pages.

\* cited by examiner

CONTROL UNIT, SYSTEM AND METHOD RELATED TO AN ANIMAL'S ENERGY BALANCE

This application is the U.S. national phase of International Application No. PCT/SE2020/050021 filed Jan. 13, 2020 which designated the U.S. and claims priority to SE Patent Application No. 1950047-9 filed Jan. 16, 2019, the entire contents of each of which are hereby incorporated by reference.

TECHNICAL FIELD

This document discloses a method, a control unit and a system. More particularly, a method, a control unit and a system are described, for improving an animal's energy balance during early lactation.

BACKGROUND

In the context of enhancing efficiency of milking, US 2011/0247563 discloses a device and a method wherein milking of an animal is ended in dependence on a comparison value which is calculated on the basis of a milking parameter representative of a milk flow from the respective teat and in dependence on a deactivation threshold. The milking of the last teat is ended in dependence of historical milking data of the animal.

At an animal farm, the wellness of the animals, such as cattle and other milk producing animals, is essential in order to promote milk yield and/or meat quality.

The wellness of an animal is closely linked to the feeding regime at the farm. It is important that each animal has an adequate body condition score, BCS, and a balanced energy intake at all times. The success or failure of a feeding regime can be detected, with some latency, e.g. by monitoring the BCS and/or the milk yield of an animal.

A female animal should preferably not be overweight around parturition, since this may lead to increased risk of metabolic disease. Typically, an animal has a negative energy balance a number of weeks after parturition, when it has difficulties to compensate for its greater energy need by a greater feed intake. This is a very sensitive period, and a large negative energy balance (or rather imbalance) is considered to be a health risk.

The reason for this health risk is that while in a negative energy balance, the animal, e.g. cow, will mobilise body fat to produce energy. In this process, ketone bodies are produced, which in small amounts can be used by the animal for energy. However, when ketone production is high (such as when the negative energy balance is large), the animal cannot use all the produced ketone bodies for energy, and thereby ketone levels increase in the blood of the animal. When this occurs, the animal may develop ketosis; a metabolic disease which affects the milk yield of the animal.

SUMMARY

In order to ensure milk production of the animal over the lactation period, it would be desired to find a way to enhance animal wellness during early lactation. Herein, this is achieved by limiting or at least reducing the negative energy balance of an animal during early lactation.

It is therefore an object of this invention to solve at least some of the above problems and reduce negative energy balance of an animal in early lactation.

According to a first aspect of the invention, this objective is achieved by a control unit for improving an animal's energy balance during early lactation of a current lactation period of the animal. Early lactation includes at least the first 3 days in milk of the current lactation period. The control unit is configured to:

obtain measurements of milk flow during a milking session of the animal;

analyse a sequence of the measurements of milk flow; and, either based on said analysis, estimate a total milk yield of the animal in order to obtain an estimated total milk yield, and determine a predetermined partial amount of milk of the estimated total milk yield; and during early lactation, interrupt the milking of the animal on all teats when the predetermined partial amount of milk of the estimated total milk yield has been drawn from the animal, or based on said analysis, detect that the milk flow of the animal has reached a plateau phase; and during early lactation, interrupt the milking of the animal during the plateau phase.

According to a second aspect of the invention, this objective is achieved by a method of controlling a milking of an animal during at least the first 3 days of a current lactation period comprising steps of:

obtaining measurements of milk flow during a milking session of the animal;

analysing a sequence of the measurements of milk flow; and either the step of analysing comprising steps of:

estimating a total milk yield of the animal in order to obtain an estimated total milk yield, and determining a predetermined partial amount of milk of the estimated total milk yield; and the method comprising a further step of:

interrupting the milking of all teats of the animal, during early lactation, when the predetermined partial amount of milk of the estimated total milk yield has been drawn from the animal;

or the step of analysing comprising a step of:

detecting that the milk flow of the animal has reached a plateau phase; and the method comprising a further step of:

interrupting the milking of all teats of the animal, during early lactation, during the plateau phase.

According to a third aspect of the invention, this objective is achieved by a system for improving an animal's energy balance during early lactation of a current lactation period of the animal. Early lactation includes at least the first 3 days in milk of the current lactation period. The system comprises:

a control unit according to any one of aspects and/or embodiments discussed herein;

an automatic milking system for extracting milk from the animal; and a milk flow meter for measuring milk flow of extracted milk from the animal.

Thanks to the described aspects, by analysing the milk flow of the animal and interrupting the milking of the animal prematurely for all teats, less milk is extracted from the animal than would have been the case if the total potential milk yield of the animal would have been extracted.

It has been realised by the inventor, that by not extracting all the milk of the animal during the milk sessions during early lactation, negative energy balance of the animal is eliminated or at least reduced, leading to reduced risk of diseases such as ketosis. Well-being, comfort and healthiness of the animal is enhanced, leading to increased total milk yield during the whole lactation period and lactation cycle. Surprisingly, premature interruption of the milking of all teats of an animal during the early period of lactation, i.e. during early lactation which includes at least the first 3 days in milk of the current lactation period of the animal, does not affect the milk yield during the following remaining period of lactation to any significant extent.

Thanks to the provided solution, the farmer is enabled to prevent the occurrence of ketosis for individual animals and on group level at the farm. The occurrence of ketosis and its negative effects on health, production and fertility may be reduced and disease treatments of the animals may be avoided.

Further, the provided solution is operable also at the first milking of an animal during its first lactation. In other words, also when no historical data of any complete milking of the animal in question, at least for the current lactation period, is available.

More specifically, this is achieved by the analysis of the sequence of the measurements of milk flow. As discussed above, the analysis leads to one of two alternatives—either estimating a total milk yield of the animal in order to obtain an estimated total milk yield, or detecting that the milk flow of the animal has reached a plateau phase. Thus, the estimated total milk yield or the determined plateau phase provide alternative data to the historical data.

Based on these alternative data interrupting the milking of all teats of the animal, during early lactation, is performed. Thus, premature interruption of the milking of all teats of the animal, without historical milking data of the relevant animal, is achieved in order to avoid or at least reduce negative energy balance of the animal during early lactation. In this manner, ketosis in the animal may be avoided.

Other advantages and additional novel features will become apparent from the subsequent detailed description.

FIGURES

Embodiments of the invention will now be described in further detail with reference to the accompanying figures, in which.

DETAILED DESCRIPTION

Embodiments of the invention described herein are defined as a control unit, a method, and a system, which may be put into practice in the embodiments described below. These embodiments may, however, be exemplified and realised in many different forms and are not to be limited to the examples set forth herein; rather, these illustrative examples of embodiments are provided so that this disclosure will be thorough and complete.

Still other objects and features may become apparent from the following detailed description, considered in conjunction with the accompanying drawings. It is to be understood, however, that the drawings are designed solely for purposes of illustration and not as a definition of the limits of the herein disclosed embodiments, for which reference is to be made to the appended claims. Further, the drawings are not necessarily drawn to scale and, unless otherwise indicated, they are merely intended to conceptually illustrate the structures and procedures described herein.

Figure 1:
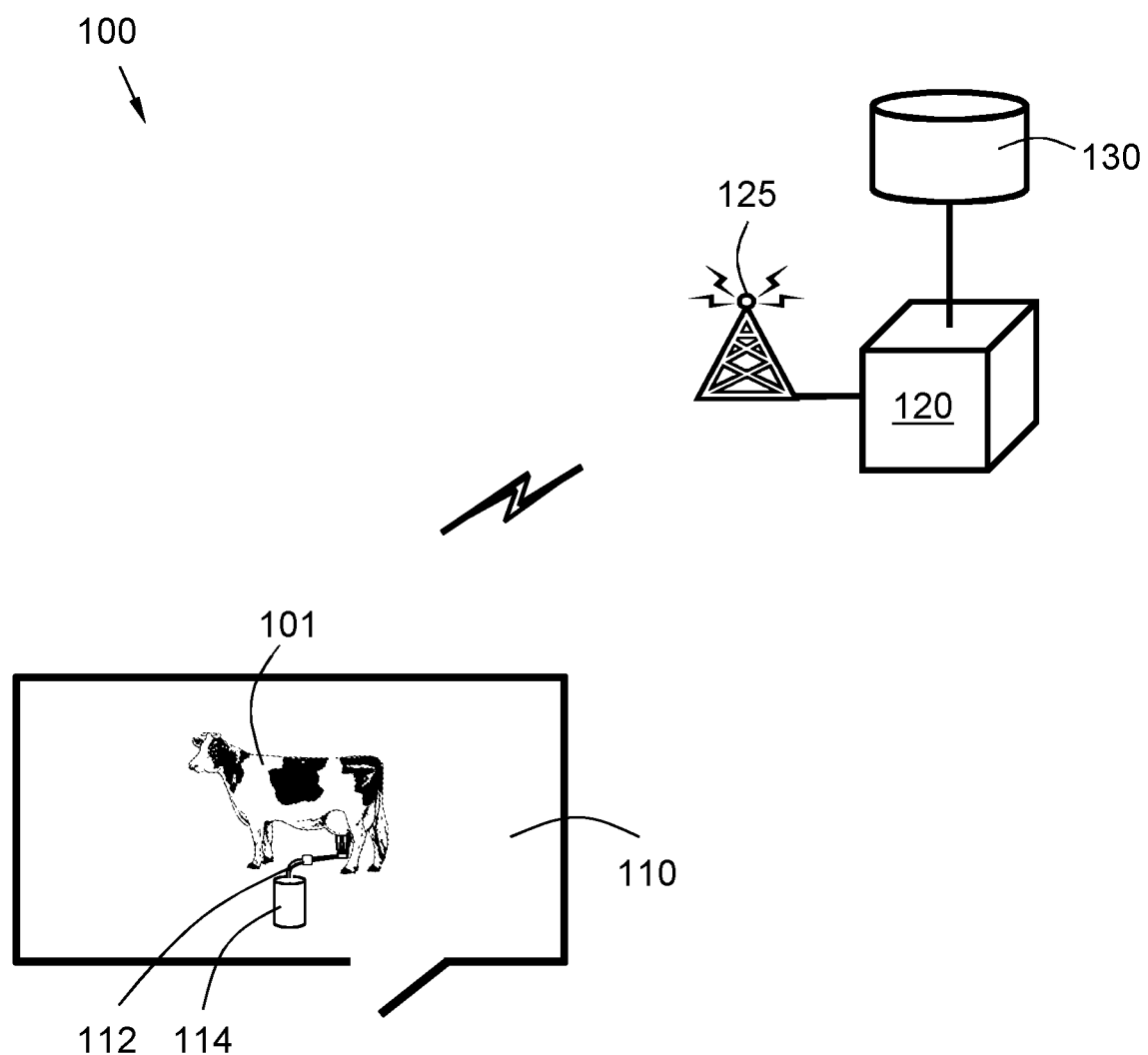
FIG. 1 illustrates an example of a system for improving an animal's energy balance during early lactation of the animal, according to an embodiment of the invention.

FIG. 1 illustrates embodiments of a system 100 for improving an animal's energy balance during early lactation of an animal, at a dairy farm 110. The dairy farm 110 comprises at least one animal 101 which may be comprised in a herd of animals of the same or different kind.

"Animal" may be any arbitrary type of domesticated animal; however, the herein provided non-limiting examples primarily relates to milk and/or meat producing animals such as cow, goat, sheep, camel, dairy buffalo, yak, etc.

High milk yield during early lactation or a steep increase of daily milk yield within the first week of lactation after parturition can lead to negative energy balance and subclinical or clinical ketosis of the female animal 101, e.g. a cow. Typically, it is difficult for an animal 101 to completely satisfy its energy need by feed intake during early lactation. It may take some days or even weeks until the energy required for milk production is in balance with the energy intake from consumption of feed.

While in a negative energy balance, the animal 101 will mobilise body fat but cannot convert this to energy in a usual manner. Instead, ketone bodies are produced which in small amounts can be used by the animal for energy. However, when ketone production is high, the cow cannot use all the ketone bodies for energy and ketone levels increase in the blood. When this occurs, the animal 101 may suffer from ketosis.

A discovered solution to this problem may be to prematurely interrupt milking of all teats of the animal 101 during milking sessions during early lactation. That is, to reduce the energy consumption by reducing the milk production, instead of, or as a complement to, increasing the amount of feed and/or the energy density of the feed.

Incomplete milking during the first days of lactation, such as the first three-seven days, has been surprisingly discovered to induce a beneficial effect on metabolism of the animal 101; a cow, for example, with incomplete milking during the first days of lactation has higher glucose and phosphorus blood concentrations and lower non-esterified fatty acids and β-hydroxybutyrate in comparison with a cow with complete milking. Furthermore, the positive effect for the animal 101 could be seen until day 28 of lactation. This shows that a gentle start of milking during the first days or week of lactation brings large health benefits, i.e. reduce the risk of ketosis without compromising milk production later during the lactation period.

Recent research has also revealed that incomplete milking the first 3-7 days of lactation does not have negative impact on udder health and/or animal behaviour. Milk yield in weeks 2-9 is not different for animals 101 with and without incomplete milking during the first days of lactation.

A solution to the problem of avoiding or reducing the negative energy balance of the animal 101, and thereby increase the milk production by avoiding diseases such as e.g. ketosis is to prematurely interrupt milking of all animal teats during milking sessions during early lactation of the animal 101, such as e.g. during the first 3 or 4 days, or there about (e.g. within an interval of approximately 1-7 days).

An algorithm may predict the development of the daily milk yield based on milking characteristics of the milk flow curve of the animal 101. These characteristics may comprise e.g. steepness of slope at the beginning of milking, peak flow, plateau phase and/or steepness of slope and other characteristics in the decline phase, milking duration and average milk flow.

In some embodiments, an animal 101 who will benefit from incomplete milking may be identified, dependent e.g. on an estimated udder fill and/or development of milk yield. An animal specific milking schedule at day 1-7 of the lactation in animals 101 with estimated high risk of developing ketosis may be applied in some embodiments. For example, this may be relevant to apply for animals having a higher than recommended Body Condition Score (BCS) at parturition, beta-hydroxybutyrate, BHB, levels in the milk of the animals, and/or the animals having a history of previously developed ketosis.

According to some embodiments, the risk of developing ketosis may be reflected by a ketosis related parameter, which may be set for an animal 101.

Information on herd specific development of the lactation curve within parity groups may be comprised in the algorithm according to some embodiments. Farmers may be offered several settings, degree of incomplete milkings, based on the herd specific risk of ketosis. In short, the algorithm determines the animal individual risk of ketosis and applies a cow individual program of incomplete milkings e.g. day 1-7, where an animal specific reduced amount of milk is harvested. In some animals 101, such as e.g. high yielding animals 101, the milk withdrawal day 1-7 may be reduced within the range of 30-50% in comparison to full emptying of the udder.

The dairy farm 110 may comprise milking equipment 114 for extracting and storing milk from the animal 101. Also, a flow measurement device 112, a milk meter, may be arranged in close association with an extraction tubing between the teats of the animal 110 and a milk container of the milking equipment 114.

The flow measurement device 112 may be arranged for wired or wireless communication with a control unit 120. In the illustrated embodiment, milk flow measurements of the flow measurement device 112 may be communicated wirelessly via a wireless transceiver 125. However, in other embodiments, information concerning milk flow measurements may be communicated to the control unit 120 over a wired communication interface.

Information concerning the milk flow may be analysed by the control unit 120. The control unit 120 may also interrupt the milking of the animal 101 prematurely, when a predetermined partial amount of milk of an estimated total milk yield of the animal 101 is reached.

The estimated total milk yield of the animal 101 forms a relevant total milk yield for the purpose of determining the predetermined partial amount of milk in the absence of a total milk yield obtained in a complete milking of the animal during the current lactation period of the animal 101.

In some embodiments, information concerning milk flow may be stored in a database 130, together with an identity reference of the animal 101 and a time reference. The stored information concerning milk flow of the animal 101 may be used subsequently for estimating the potential total milk yield of the animal 101, at a later milking event.

The database 130 may also contain data related to the progress of a current lactation period of an animal 101. In particular, the day, e.g. the date, on which milking of the animal starts may be stored in the database 130, and thus, the number of days into lactation may also be stored in the database 130, or determined by the control unit 120. Accordingly, the control unit 120 may determine whether the animal 101 is in early lactation.

The identity reference of the animal 101 may be determined either manually by a farmer; or automatically, e.g. by a conventional identification system using RFID tags/transponders, scanning of a visible code on an ear tag, image recognition of animals or a tag or sign on the animals, or in some other convenient manner. The database 130 may comprise individual milk flow characteristics associated with a respective animal identity reference of various animals of the herd at the farm 110.

In the database 130, one or more ketosis related parameters may be stored for one or more animals 101 at the farm 110.

The control unit 120 may be configured to obtain a ketosis related parameter of an animal 101, e.g. from the database 130.

The control unit 120 may in some embodiments be integrated in the milking equipment 114 and/or the flow measurement device 112.

The above discussed embodiments relate inter alia to a control unit 120 for improving an animal's 101 energy balance during early lactation of a current lactation period of the animal.

The control unit 120 is configured to:
obtain measurements of milk flow during a milking session of the animal 101;
analyse a sequence of the measurements of milk flow; and
either based on said analysis, estimate a total milk yield of the animal 101 in order to obtain an estimated total milk yield, and determine a predetermined partial amount of milk of the estimated total milk yield; and during early lactation, interrupt the milking of the animal 101 on all teats when the predetermined partial amount of milk of the estimated total milk yield has been drawn from the animal 101,
or based on said analysis, detect that the milk flow of the animal 101 has reached a plateau phase 220; and during early lactation, interrupt the milking of the animal 101 during the plateau phase 220.

Figure 2:
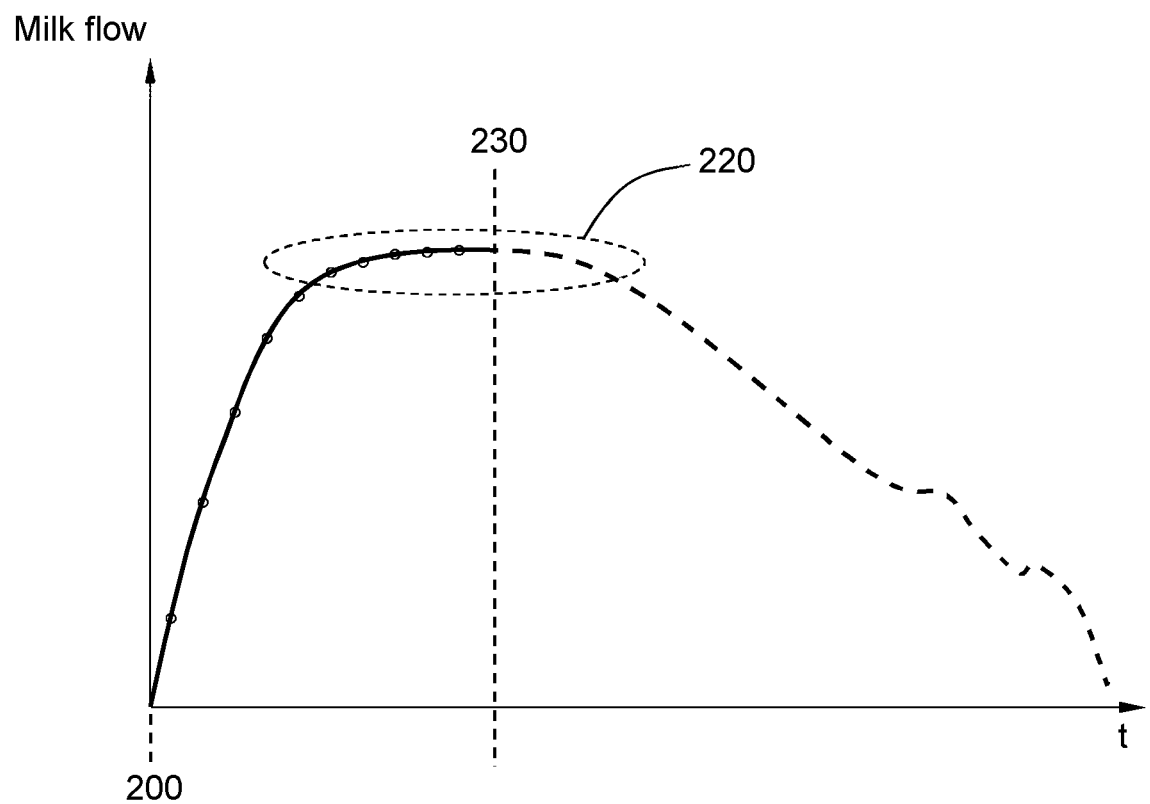
FIG. 2 illustrates milk flow measurements of an animal, according to an example.

FIG. 2 illustrates a diagram showing milk flow over time during one milking session of an animal 101. A number of milk flow measurements 210 may be made, e.g. at a predetermined or configurable regular or irregular time interval in between them. In the following reference is also made to FIG. 1.

The measurements of the milk flow of the animal 101, such as e.g. Kg per minute, may be made by the measurement device 112 of the milking equipment 114 during a milking session 35 of the animal 101. The flow measurement device 112 may provide the measurement results to the control unit 120. The control unit 120 may then use the milk flow measurements 210 for analysis of the milk flow of the animal 101 and estimate a point in time for prematurely interrupting the milking session of the animal 101 during early lactation. "Early lactation" may be e.g. the first 3 days of lactation, the first 4 days of lactation, the first 5 days of lactation, etc., up to e.g. the first 8 days of lactation in different embodiments.

The total milk yield during the milking may be regarded as the size of the area beneath the milk flow curve, i.e. the integral of the milk flow curve.

The milk flow curve, or rather the actual milk flow sequence which the curve represents, may comprise three particularly interesting phases or segments. The first segment may comprise a flow increase. The flow increase may be defined as the period from when the so-called alveoli-milk (i.e. not the so-called cistern milk) starts to flow, up to a second segment, a peak phase or plateau phase 220. The flow increase may preferably be defined as/by the flow increase rate, calculated e.g. as the derivative of the milk flow curve during the flow increase. The flow increase could alternatively or in addition be defined as/by the time period required for the milk flow increase.

The plateau phase 220 may be defined as a milk flow level at the peak flow of the animal 101, or e.g. within a percentage of the peak flow level, such as e.g. 5%, 10% etc. The plateau phase 220 may be defined as a peak flow duration, i.e. the length in time wherein the milk flow of the animal 101 is maintained with a particular milk flow interval.

When the milk flow of the animal 101 decreases below the milk flow level of the plateau phase 220, a transition is made to a third segment comprising a flow decrease, illustrated with a dashed line in FIG. 2. The flow decrease defines a decrease in milk flow. The flow decrease may be defined as a flow decrease rate, i.e. the derivative of the milk flow curve during the flow decrease, and/or the duration of the flow decrease, i.e. the flow decrease time.

After the third segment, a post milking period normally may terminate the milking. The length of the post milking period is configurable by the farmer. As the milking is prematurely interrupted, there is no post milking period according to the provided solution, and typically no flow decrease phase either.

When the control unit 120 has determined that the animal 101 is in early lactation and, based on analysis of the milk flow of the animal 101, has estimated that a predetermined partial amount of milk 230 of an estimated total milk yield of the animal 101 is reached, the milking of the animal is interrupted. The predetermined partial amount of milk 230 of the estimated total milk yield may for example be set to an amount lower than 60% of the estimated total milk yield, such as for example within 30-50% of an estimated total milk yield in some embodiments; or there about.

In some embodiments, the predetermined partial amount of milk 230 of the estimated total milk yield may be different for different days of the lactation in an increasing manner; i.e. the first day of lactation, the predetermined partial amount of milk 230 may be set to about 30%, the second day of lactation, the predetermined partial amount of milk 230 may be set to about 40%, the third day of lactation, the predetermined partial amount of milk 230 may be set to about 50%, the fourth day of lactation, the predetermined partial amount of milk 230 may be set to about 60%, etc.

When the control unit 120 estimates that the extracted milk yield has reached the predetermined partial amount of milk 230, an instruction may be generated and sent to the milking equipment 114 for interrupting the milking of the animal 101 on all teats prematurely, i.e. before all the milk in the udder of the animal 101 has been extracted.

Alternatively, when the control unit 120 has determined that the animal 101 is in early lactation and detects that the milk flow of the animal 101 has reached a plateau phase 220, an instruction may be generated and sent to the milking equipment 114 for interrupting the milking of the animal 101 on all teats prematurely, i.e. before all the milk in the udder of the animal 101 has been extracted. The reaching of the plateau phase 220 may be determined by calculating the derivative of the milk flow curve and determining when the derivative is approximately zero.

Thereby, by not extracting all the milk of the animal 101 during the milk sessions during early lactation, negative energy balance of the animal 101 is eliminated or at least reduced, leading to reduced risk of diseases such as ketosis. Well-being, comfort and healthiness of the animal 101 is enhanced, leading to increased total milk yield.

Thanks to the provided solution, the farmer is enabled to prevent the occurrence of ketosis for individual animal 101 and on group level at the farm 110. The occurrence of ketosis and its negative effects on health, production and fertility may be reduced and disease treatments of the animals 101 may be avoided.

In some embodiments, the predetermined partial amount of milk 230 of the estimated total milk yield may be determined when the milk flow of the animal 101 has reached a plateau phase 220. As mentioned above, the reaching of the plateau phase 220 may be determined by calculating the derivative of the milk flow curve and determining when the derivative is approximately zero.

However, the plateau phase 220 may be determined by detecting that the difference between two milk flow measurements 210 is smaller than a predetermined threshold limit; and/or that the latest taken milk flow measurement 210 is lower than the penultima taken milk flow measurement sample 210, in some embodiments.

Figure 3:
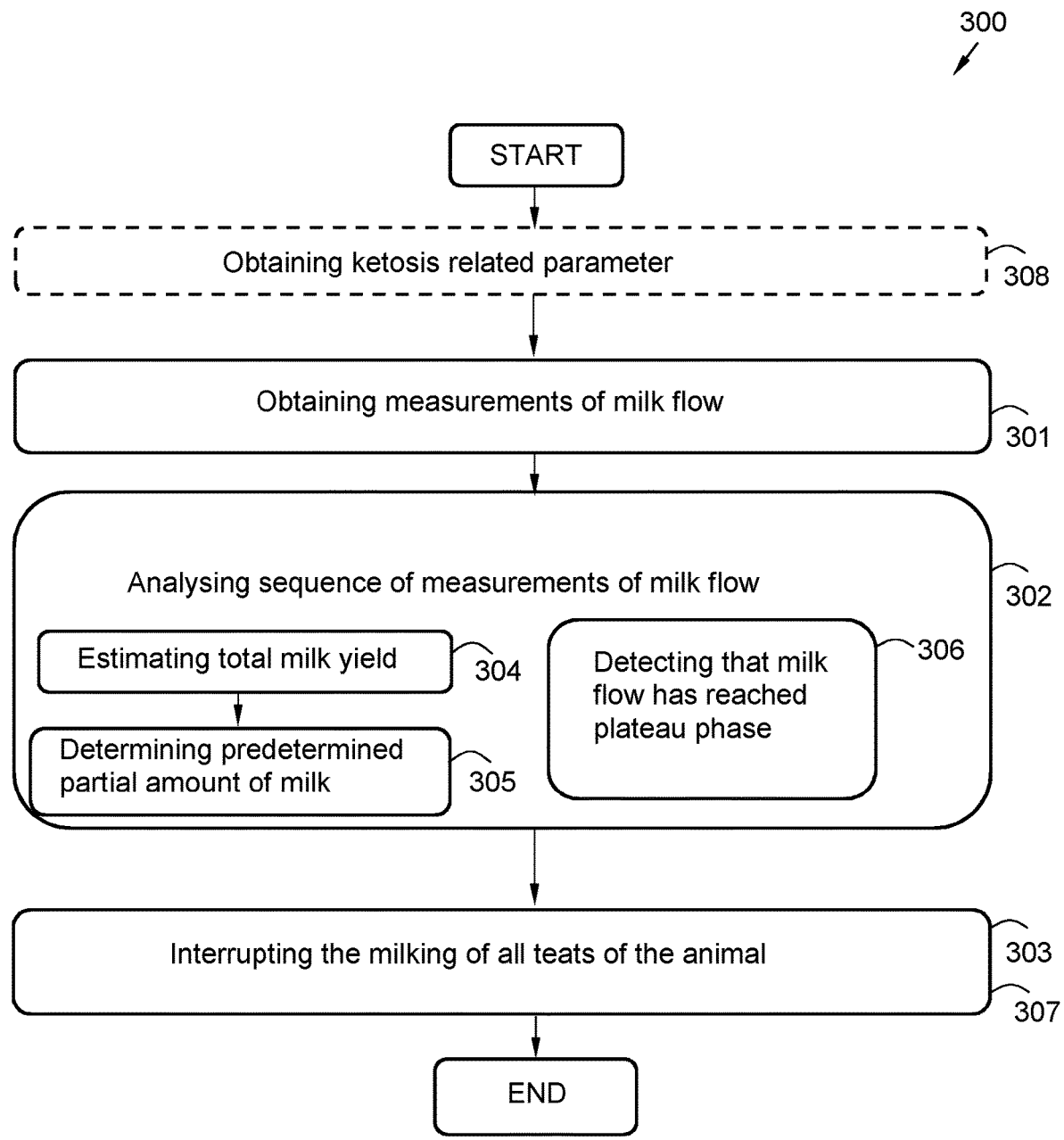
FIG. 3 is a flow chart illustrating an embodiments of a method.

FIG. 3 illustrates an example of a method 300 according to an embodiment. In the following reference is also made to FIGS. 1 and 2. The flow chart in FIG. 3 shows the method 300 executed in a control unit 120 for improving an animal's energy balance during early lactation of an animal 101, wherein no data of a current milking of the animal 101 during the current lactation period is available, by prematurely interrupting milking of all teats during early lactation of the animal 101. The animal 101 may typically have four teats, but some animals 101 may have another number of teats.

The early lactation of the animal 101 may comprise at least the first 3 days or the first 4 days in milk of the animal 101.

In order to correctly interrupt the milking, the method 300 may comprise a number of steps 301-308. However, some of these steps 301-308 may be performed solely in some alternative embodiments. Further, the described steps 301-308 may be performed in a somewhat different chronological order than the numbering suggests. The method 300 may comprise the subsequent steps:

Step 301 comprises obtaining measurements of milk flow (such as e.g. litres per minute) during a milking session of the animal 101.

The milk flow may be measured by a flow measurement device 112 at the farm 110 and reported to the control unit 120 via a wired or wireless communication interface.

The milk flow measurements may be obtained at regular time intervals such as every second, every five seconds, every 0.2 second, etc., and/or at irregular time intervals.

Step 302 comprises analysing a sequence of the measurements of milk flow.

Step 302 is followed by either a step 303 comprising interrupting the milking of all teats of the animal 101, or a step 307 comprising interrupting 307 the milking of all teats of the animal 101.

Namely, according to a first alternative, the step 302 of analysing comprises steps of:
estimating 304 a total milk yield of the animal 101 in order to obtain an estimated total milk yield, and
determining 305 a predetermined partial amount of milk of the estimated total milk yield; and the method (300) comprising a further step of:
Accordingly, the analysis 302 of the sequence of the obtained 301 measurements of milk flow may comprise estimating a total milk yield of the animal 101, should it be milked completely, during the milking session, based on the sequence of obtained 301 measurements of milk flow.

In the step of estimating 304, the obtained 301 milk flow measurements of the animal 101 may be compared with corresponding milk flow measurements made on another animal, for which the total milk yield is known. When a match is found with a milk curve of any other animal, i.e. when the difference between the respective milk flow measurements is smaller than a predetermined threshold limit, by analysing, comparing and matching the respective beginnings of the lactation curves, the total milk yield of the animal 101 may be approximated.

In yet some alternative embodiments, the total milk yield of the animal 101 may be estimated based on knowledge of total milk yield of other animals of the same race, age (lactation cycle), size, body condition score of the animal 101, nutrition intake of the animal 101, and/or other similar factors. Alternatively, estimating 304 the total milk yield of the animal 101 may relate to a time period passing after initiation of the milking session, which time period is based on milking experience from other animals at the farm of the same kind, race, size and/or lactation cycle.

In these embodiments, the method 300 comprising a further step of:

interrupting 303 the milking of all teats of the animal 101, during early lactation, when the predetermined partial amount of milk of the estimated total milk yield has been drawn from the animal 101.

Further, according to a second alternative, the step 302 of analysing comprises a step of:

detecting 306 that the milk flow of the animal 101 has reached a plateau phase 220.

In these embodiments, the method 300 comprises a further step of:

interrupting 307 the milking of all teats of the animal 101, during early lactation, during the plateau phase 220.

In the steps of analysing 302 and detecting 306, the plateau phase 220 may be detected by comparing obtained 301 measurement values 210 with each other and determining that the difference between the latest obtained 301 milk flow measurement value 210 and the penultima latest obtained 301 milk flow measurement value 210 is smaller than a threshold limit L, such as e.g. a percentage of the penultima latest obtained 301 milk flow measurement value 210, e.g. L=1%; L=0.1%; L=2%, etc. (non-limiting examples).

Thus: when milk flow$_{n+1}$−milk flow$_n$≤L, it may be determined that the animal 100 has reached the plateau phase 220. Also, or alternatively, when milk flow$_{n+1}$−milk flow$_n$ is smaller than zero, it may be determined that the animal 100 has reached the plateau phase 220 and is approaching end of the plateau phase 220.

The analysis of the sequence of the obtained 301 measurements of milk flow may be made to predict expected milk yield of the ongoing milking and to determine a predefined point of interruption of the milking, in some embodiments.

Step 303 comprises interrupting the milking of all teats of the animal 101, during early lactation, when the predetermined partial amount of milk of the estimated total milk yield has been drawn from the animal 101, based on the analysis 302.

Step 307 comprises interrupting the milking of all teats of the animal 101, during early lactation, during the plateau phase 220.

The above discussed embodiments of the method 300 relate to a method 300 of controlling a milking of an animal 101 during at least the first 3 days of a current lactation period comprising steps of:

obtaining 301 measurements of milk flow during a milking session of the animal 101;

analysing 302 a sequence of the measurements of milk flow; and either the step of analysing 302 comprising steps of:

estimating 304 a total milk yield of the animal 101 in order to obtain an estimated total milk yield, and determining 305 a predetermined partial amount of milk of the estimated total milk yield; and the method 300 comprising a further step of:

interrupting 303 the milking of all teats of the animal 101, during early lactation, when the predetermined partial amount of milk of the estimated total milk yield has been drawn from the animal 101;

or the step of analysing 302 comprising a step of:

detecting 306 that the milk flow of the animal 101 has reached a plateau phase 220; and the method 300 comprising a further step of:

interrupting 307 the milking of all teats of the animal 101, during early lactation, during the plateau phase 220.

The predetermined partial amount of milk 230 may be lower than 60% of the estimated total milk yield in some embodiments. In some embodiments, the predetermined partial amount of milk 230 may be within 30-50% of the estimated total milk yield.

Thereby, by prematurely interrupting the milking of the animal 101, negative energy balance during early lactation of the animal 101 may be avoided or at least reduced. Thereby, diseases such as ketosis may be avoided, leading to increased total milk yield during the lactation cycle of the animal 101.

According to some embodiments, the step of interrupting 303 the milking of all teats of the animal 100, during early lactation, when the predetermined partial amount of milk of the estimated total milk yield has been drawn from the animal 101, or the step of interrupting 307 the milking of all teats of the animal 101, during early lactation, during the plateau phase 220, is preceded by a step of:

obtaining 308 a ketosis related parameter of the animal 101.

In this manner, the ketosis related parameter may be utilised for determining whether method 300 is to be applied when milking of the relevant animal 101 is started at the beginning of the lactation period of the animal 101.

The step of obtaining 308 a ketosis related parameter of the animal 101 may performed as a first step of the method 300, as shown in FIG. 3. Alternatively, the step of obtaining a ketosis related parameter may be performed at any time preceding one of the steps of interrupting 303 or 307.

The ketosis related parameter of the animal 101 may be a parameter indicating the likelihood of the animal 101 developing ketosis. For instance, the ketosis related parameter may be a BCS of the animal 101, e.g. if the BCS value is higher than a threshold value, the animal 101 could develop ketosis and the method 300 is applied when milking the animal 101. A further example of a ketosis related parameter may be a Boolean parameter indicating whether the animal 101 has had ketosis during a previous lactation period, e.g. if the Boolean parameter indicates than the animal 101 has previously had ketosis, the method 300 is applied when milking the animal 101.

Figure 4:
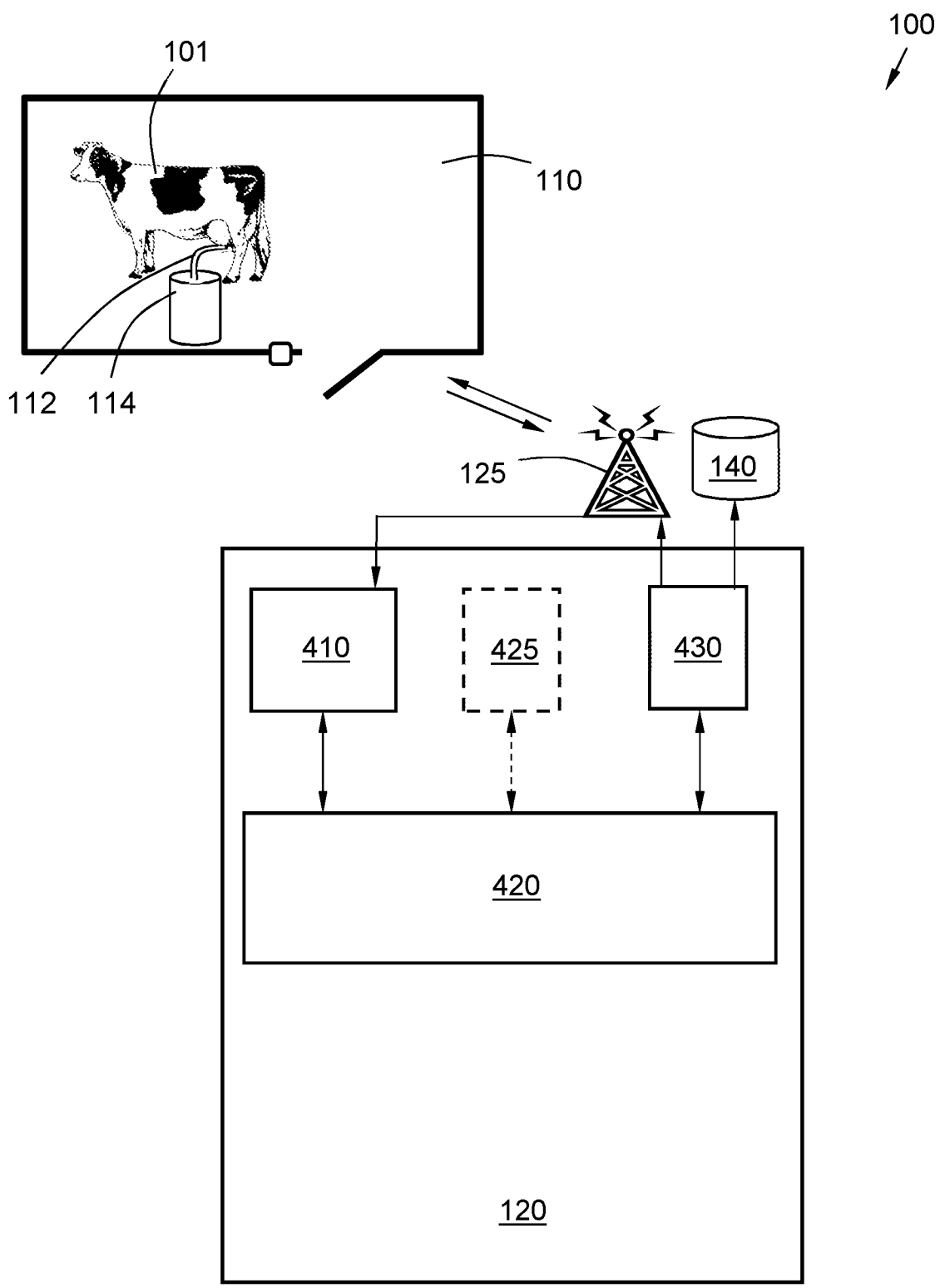
FIG. 4 is an illustration depicting a system according to an embodiment.

FIG. 4 illustrates an embodiment of a system 100 for improving an animal's energy balance during early lactation of an animal 101, wherein no data of a complete milking of the animal 101 during the current lactation period is available, by prematurely interrupting milking of all teats during early lactation of the animal 101. Reference is also made to FIGS. 1-3. Accordingly, FIG. 4 illustrates a system 100 for improving an animal's 101 energy balance during early lactation of a current lactation period of the animal 101 The early lactation includes at least the first 3 days in milk of the current lactation period. The system 100 comprises:

a control unit 120 according to any one of aspect and/or embodiments discussed herein;

an automatic milking system 114 for extracting milk from the animal 101; and a milk flow meter 112 for measuring milk flow of extracted milk from the animal 101.

The early lactation of the animal 101 may comprise at least the first 3 days or the first 4 days in milk of the animal 101, i.e. the first 3 days or the first 4 days of the current lactation period of animal 101.

The system 100 comprises a control unit 120. The control unit 120 is configured to perform at least some of the previously described steps 301-308 according to the method 300 described above and illustrated in FIG. 3. The control unit 120 is thereby configured to obtain measurements of milk flow during a milking session of the animal 101. Also, the control unit 120 is configured to analyse a sequence of said obtained measurements of milk flow; and, based on said analysis, interrupt the milking of the animal 101 prematurely, when approximately a predetermined partial amount of milk 230 of an estimated total milk yield has been reached, or when the milk flow of the animal 101 has reached a plateau phase 220.

Accordingly, in some embodiments, the control unit 120 may be configured to analyse the sequence of obtained measurements of milk flow per time unit by detecting that the milk flow per time unit of the animal 101 has reached a plateau phase 220. Further, the control unit 120 may also be configured to interrupt the milking of the animal 101 prematurely during the plateau phase 220, e.g. by sending a command to the milking equipment 114 of the animal 101.

Further, the control unit 120 may also be configured to estimate a total milk yield of the animal 101, should it be milked completely, during the milking session, based on the analysis of the sequence of obtained measurements of milk flow.

The predetermined partial amount of milk may be lower than 60% of an estimated total milk yield in some embodiments, such as e.g. within 30-50% of the estimated total milk yield.

The system 100 may in some embodiments also comprise a database 140, configured to store animal milk flow related parameters possibly associated with an identity reference of the animal 101 and a time stamp.

The control unit 120 may comprise a receiving circuit 410 configured to receive information from the transceiver 125, from the flow measurement unit 112.

The control unit 120 also may comprise a processing circuit 420 configured for performing various calculations for conducting the method 300 according to at least some of the previously described steps 301-308.

Such processing circuit 420 may comprise one or more instances of a processing circuit, i.e. a Central Processing Unit (CPU), a processing unit, a processing circuit, a processor, an Application Specific Integrated Circuit (ASIC), a microprocessor, or other processing logic that may interpret and execute instructions. The herein utilised expression "processor" may thus represent a processing circuitry comprising a plurality of processing circuits, such as, e.g., any, some or all of the ones enumerated above.

Furthermore, the control unit 120 may comprise a memory 425 in some embodiments. The optional memory 425 may comprise a physical device utilised to store data or programs, i.e., sequences of instructions, on a temporary or permanent basis. According to some embodiments, the memory 425 may comprise integrated circuits comprising silicon-based transistors. The memory 425 may comprise e.g. a memory card, a flash memory, a USB memory, a hard disc, or another similar volatile or non-volatile storage unit for storing data such as e.g. ROM (Read-Only Memory), PROM (Programmable Read-Only Memory), EPROM (Erasable PROM), EEPROM (Electrically Erasable PROM), etc. in different embodiments.

Further, the control unit 120 may comprise a signal transmitting circuit 430. The signal transmitting circuit 430 may be configured for transmitting signals via a wired or wireless communication interface to the transceiver 125, the database 140 and/or the milking equipment 114.

However, in some alternative embodiments, the system 100 may comprise additional units for performing the method 300 according to steps 301-308.

The above described method steps 301-308 to be performed in the control unit 120 may be implemented through the one or more processing circuits 420 within the control unit 120, together with a computer program for performing at least some of the functions of the steps 301-308. Thus, the computer program comprises instructions which, when the computer program is executed by the control unit 120 in the system 100, cause the control unit 120 to carry out the method 300 according to at least some of steps 301-308.

The computer program mentioned above may be provided for instance in the form of a computer-readable medium, i.e. a data carrier carrying computer program code for performing at least some of the method steps 301-308 according to some embodiments when being loaded into the one or more processing circuits 420 of the control unit 120. The data carrier may be, e.g., a hard disk, a CD ROM disc, a memory stick, an optical storage device, a magnetic storage device or any other appropriate medium such as a disk or tape that may hold machine readable data in a non-transitory manner. The computer program may furthermore be provided as computer program code on a server and downloaded to the control unit 120 remotely, e.g. over an Internet or an intranet connection.

The terminology used in the description of the embodiments as illustrated in the accompanying drawings is not intended to be limiting of the described method 300; the control unit 120; the computer program; the system 100 and/or the computer-readable medium. Various changes, substitutions and/or alterations may be made, without departing from invention embodiments as defined by the appended claims.

As used herein, the term "and/or" comprises any and all combinations of one or more of the associated listed items. The term "or" as used herein, is to be interpreted as a mathematical OR, i.e., as an inclusive disjunction; not as a mathematical exclusive OR (XOR), unless expressly stated otherwise. In addition, the singular forms "a", "an" and "the" are to be interpreted as "at least one", thus also possibly comprising a plurality of entities of the same kind, unless expressly stated otherwise. It will be further understood that the terms "includes", "comprises", "including" and/or "comprising", specifies the presence of stated features, actions, integers, steps, operations, elements, and/or components, but do not preclude the presence or addition of one or more other features, actions, integers, steps, operations, elements, components, and/or groups thereof. A single unit such as e.g. a processor may fulfil the functions of several items recited in the claims. The mere fact that certain measures or features are recited in mutually different dependent claims, illustrated in different figures or discussed in conjunction with different embodiments does not indicate that a combination of these measures or features cannot be used to advantage. A computer program may be stored/distributed on a suitable medium, such as an optical storage medium or a solid-state medium supplied together with or as part of other hardware but may also be distributed in other forms such as via Internet or other wired or wireless communication system.

The invention claimed is:

1. A control unit (120) for improving an animal's (101) energy balance during early lactation of a current lactation period of the animal (101), wherein the control unit (120) is configured to:
   obtain measurements of milk flow during a milking session of the animal (101);
   analyse a sequence of the measurements of milk flow from the milking session; and,
   based on said analysis and the control unit (120) having determined the animal is in early lactation, the control unit detecting, from said analysing of the sequence of the measurements of milk flow from the milking session, that the milk flow of the animal (101) has reached a plateau phase (220); and
   during early lactation and based on the detection that the milk flow of the animal during the milking session has reached a plateau phase, interrupt the milking of the animal (101) during the plateau phase (220),
   wherein the control unit determines reaching of the plateau phase by calculating the derivative of a milk flow curve for the milking session and then generating a signal to interrupt the milking of the animal during the plateau phase (220), and
   wherein early lactation includes at least a first 8 days in milk of a current lactation period.

2. The control unit (120) according to claim 1, being further configured to obtain a ketosis related parameter of the animal (101) and, based on the obtained ketosis related parameter, applies an individual program of incomplete milking specific to the animal.

3. The control unit (120) of claim 1, wherein the control unit considers the early lactation to include at least a first 3 days in milk of the current lactation period.

4. The control unit (120) of claim 1, wherein, when the calculated derivative is approximately zero, the signal to interrupt the milking of the animal during the plateau phase (220) is generated.

5. A system (100) for improving an animal's (101) energy balance during early lactation of a current lactation period of the animal (101), wherein early lactation includes at least the first 3 days in milk of the current lactation period, which system (100) comprises:
   the control unit (120) according to claim 1;
   an automatic milking system (114) for extracting milk from the animal (101); and
   a milk flow meter (112) for measuring milk flow of extracted milk from the animal (101).

6. A method (300) of controlling a milking of an animal (101) during a current lactation period comprising steps of:
   obtaining (301) measurements of milk flow during a milking session of the animal (101);
   analysing (302) a sequence of the measurements of milk flow during the milking session of the animal (101); and
   a step of analysing (302) comprising a step of:
   determining the animal is in early lactation, and
   having determined the animal is in early lactation, detecting (306) that the milk flow of the animal (101) has reached a plateau phase (220) from the analysing of the sequence of the measurements of milk flow during the milking session of the animal; and
   based on said determination that the animal is in early lactation and the detection that the milk flow of the animal during the milking session has reached the plateau phase, interrupting (307) the milking of all teats of the animal (101), during early lactation, during the plateau phase (220),
   wherein the detection that the milk flow of the animal during the current one milking session has reached the plateau phase is done by calculating the derivative of a milk flow curve for the current one milking session, and
   wherein early lactation includes at least a first 8 days in milk of the current lactation period.

7. The method (300) according to claim 6, wherein the step of interrupting (303) the milking of all teats of the animal (100), during early lactation, the step of interrupting (307) the milking of all teats of the animal (101), during early lactation, during the plateau phase (220), is preceded by a step of:
   obtaining (308) a ketosis related parameter of the animal (101) and, based on the obtained ketosis related parameter, applying an incomplete milking specific to the animal.

8. The method (300) of claim 6, wherein the early lactation includes at least a first 3 days in milk of the current lactation period.

9. The method of claim 6, wherein, the calculated derivative being approximately zero determines that the milking session has reached the plateau phase.

* * * * *